(12) United States Patent
Gallu et al.

(10) Patent No.: US 7,079,911 B2
(45) Date of Patent: Jul. 18, 2006

(54) METHOD AND SYSTEM FOR AUTOMATICALLY ISOLATING SUSPECT ITEMS IN A MANUFACTURING OR ASSEMBLY ENVIRONMENT

(75) Inventors: Michael A. Gallu, Royal Oak, MI (US); John Pauli, Trenton, MI (US); Richard Maisonville, Novi, MI (US); William C. Brower, Commerce Twp, MI (US)

(73) Assignee: Ford Motor Company, Dearborn, MI (US)

( * ) Notice: Subject to any disclaimer, the term of this patent is extended or adjusted under 35 U.S.C. 154(b) by 32 days.

(21) Appl. No.: 10/723,897

(22) Filed: Nov. 26, 2003

(65) Prior Publication Data

US 2005/0113957 A1    May 26, 2005

(51) Int. Cl.
*G06F 19/00* (2006.01)

(52) U.S. Cl. .................. 700/109; 700/95; 700/108; 702/84

(58) Field of Classification Search .............. 700/90, 700/95, 108, 109, 110; 702/81, 83, 84
See application file for complete search history.

(56) References Cited

U.S. PATENT DOCUMENTS

| | | | |
|---|---|---|---|
| 4,509,123 A | | 4/1985 | Vereen |
| 5,060,279 A | * | 10/1991 | Crawford et al. .............. 706/20 |
| 5,077,674 A | | 12/1991 | Tischler et al. |
| 5,099,436 A | * | 3/1992 | McCown et al. .............. 702/82 |
| 5,596,712 A | * | 1/1997 | Tsuyama et al. .............. 714/26 |
| 5,761,064 A | | 6/1998 | La et al. |
| 6,027,022 A | | 2/2000 | Hong |
| 6,036,087 A | | 3/2000 | Hong et al. |
| 6,182,053 B1 | | 1/2001 | Rauber et al. |
| 6,516,280 B1 | | 2/2003 | Haraburda et al. |
| 2002/0128957 A1 | | 9/2002 | Rosenberg et al. |
| 2003/0009396 A1 | | 1/2003 | DeVries et al. |
| 2003/0055753 A1 | | 3/2003 | Dellar et al. |

* cited by examiner

Primary Examiner—Jayprakash N. Gandhi
(74) Attorney, Agent, or Firm—Brooks Kushman, P.C.; Gary A. Smith (57) ABSTRACT

A computer-implemented method and system includes capabilities for receiving suspect item definitions (e.g. item serial numbers, lot numbers, operation identifiers, date ranges, etc.) into a computer database, detecting item identifiers in a manufacturing or assembly process, and comparing the item identifiers with the suspect item definitions. If the detected item identifier falls within one of the suspect item definitions, the item is automatically isolated or otherwise rejected from manufacturing or assembly process. Other aspects of the invention include functionality for determining the location of suspect items. Locations may be inferred and off-site. Another aspect includes automatically modifying the manufacturing or assembly process to bypass one or more suspect manufacturing or assembly operations. A plurality of user interfaces are provided for defining, locating and managing suspect items. Suspect item definitions and location information may by broadcast or otherwise communicated to distributed locations (e.g. holding areas, warehouses, etc.).

20 Claims, 5 Drawing Sheets

METHOD AND SYSTEM FOR AUTOMATICALLY ISOLATING SUSPECT ITEMS IN A MANUFACTURING OR ASSEMBLY ENVIRONMENT

BACKGROUND OF THE INVENTION

1. Field of the Invention

The present invention relates generally to computer hardware and software systems for manufacturing an assembly, and more particularly to a method and system for automatically isolating suspect items in a manufacturing or assembly environment.

2. Background Art

Embodiments of the present invention seek to improve upon prior art methods for tracking and isolating suspect items in a manufacturing or assembly environment (e.g. defective parts or assemblies, mis-builds, recall items, etc.).

Prior art methods for tracking and isolating suspect items, although generally effective, are manually-implemented and typically result in more items being isolated or recalled than necessary to ensure that truly suspect items are isolated from manufacturing/assembly, delivery or sale. Such an over-breadth in the scope of suspect items, however, results in unnecessary cost and effort associated with scrapping, re-manufacturing or recalling suspect items.

Prior art methods lack aspects of the present invention which enable isolation of a more accurate and narrow scope of suspect items. In a perfect implementation of the present invention, only items that are truly suspect are isolated from the manufacturing/assembly process. Of course, perfection is not always possible.

In one prior art method, for example, a particular machining operation may be divided among multiple machining stations, without a means to track which items went through which machining station. In the event that one of the machining stations was found to be defective, plant floor personnel would have to manually "round-up" and scrap, re-manufacture or recall all items that were machined at any of the machining stations. Due to a lack of accurate item tracking, this is the only way to ensure that items which are truly suspect (i.e. the items that were machined at the defective machining station) are isolated from the remainder of the manufacturing/assembly process.

In large-scale production with high item complexity (model variation), the impact of such an over-broad scope of suspect items can be very significant. In the automotive industry, for example, such a scenario in an early manufacturing process (e.g., engine machining) could result in a very large scope of engine assemblies or automobiles that must be scrapped or recalled—even though only a very small percentage of those items are truly defective.

Embodiments of the present invention seek to remove the guesswork and over-breadth associated with prior art methods of isolating suspect items in manufacturing and assembly environments.

SUMMARY OF THE INVENTION

One objective of the present invention is to automatically isolate suspect items in an assembly or manufacturing environment.

Another objective of the present invention is to locate suspect items within an ongoing manufacturing or assembly process. In some instances, the location of suspect items may be inferred based on known location information. Suspect item locations may also be provided for items that have already been partially or completely assembled or manufactured—items that are located in racks, holding areas, warehouses, other plants, in-transit, etc.

Another objective of the present invention is to automatically modify or otherwise adapt a manufacturing or assembly process to avoid or bypass suspect manufacturing or assembly operations.

According to preferred embodiments of the present invention, a computer-implemented method and system for isolating suspect items in a manufacturing or assembly process includes capabilities for receiving suspect item definitions (e.g. item serial numbers, lot numbers, operation identifiers, date ranges, etc.) into a computer database, detecting item identifiers in a manufacturing or assembly process, and comparing the item identifiers with the suspect item definitions.

If the detected item identifier falls within one of the suspect item definitions, the item is automatically isolated or otherwise rejected from the manufacturing or assembly process.

Other embodiments include functionality for determining the location of suspect items. Locations may be inferred based on known information. Locations may also be outside of the manufacturing or assembly process (e.g. holding areas, warehouses, in-transit, other plants, etc.). Suspect item definitions and location information may by broadcast or otherwise communicated to distributed locations (e.g. holding areas, warehouses, etc.).

Another aspect includes automatically modifying the manufacturing or assembly process to bypass one or more suspect manufacturing or assembly operations.

A plurality of user interfaces may be provided for defining, locating and managing suspect items.

DETAILED DESCRIPTION OF THE PREFERRED EMBODIMENT(S)

Aspects of the present invention may be implemented in association with a manufacturing or assembly line where raw parts, components, sub-assemblies or materials, etc. ("items") are introduced or otherwise input into the line, some or all of the items having unique identifiers (e.g. serial numbers, lot numbers, manufacturing dates, etc.) During the manufacturing or assembly process, these item identifiers may be detected and recorded by a computer system referred to herein as a data collection system.

At designated data collection points in the manufacturing/assembly process (referred to herein as upload points), messages may be transmitted to a data collection system. The messages may include a variety of information including the item identifiers, the station name, an operation ID, the date/time, etc. Upload points may be PCs or PLCs.

Item identifiers may be captured or otherwise detected in a variety of manners, including an RF tag and reader, barcode label and reader, 2D barcode etch or an identifier inked onto an item.

According to a preferred embodiment, a data collection system receives and maintains a database of suspect item definitions (e.g. defective or non-conforming items, lot numbers, date ranges, etc. to be isolated or otherwise removed from the manufacturing/assembly process).

According to one aspect of the present invention, the upload points check whether an item is suspect by requesting an item check from the data collection system. The data collection system then responds with a "yes" or "no" message, and the item is routed, as necessary, to isolate or reject the item from the manufacturing or assembly process.

Figure 1:
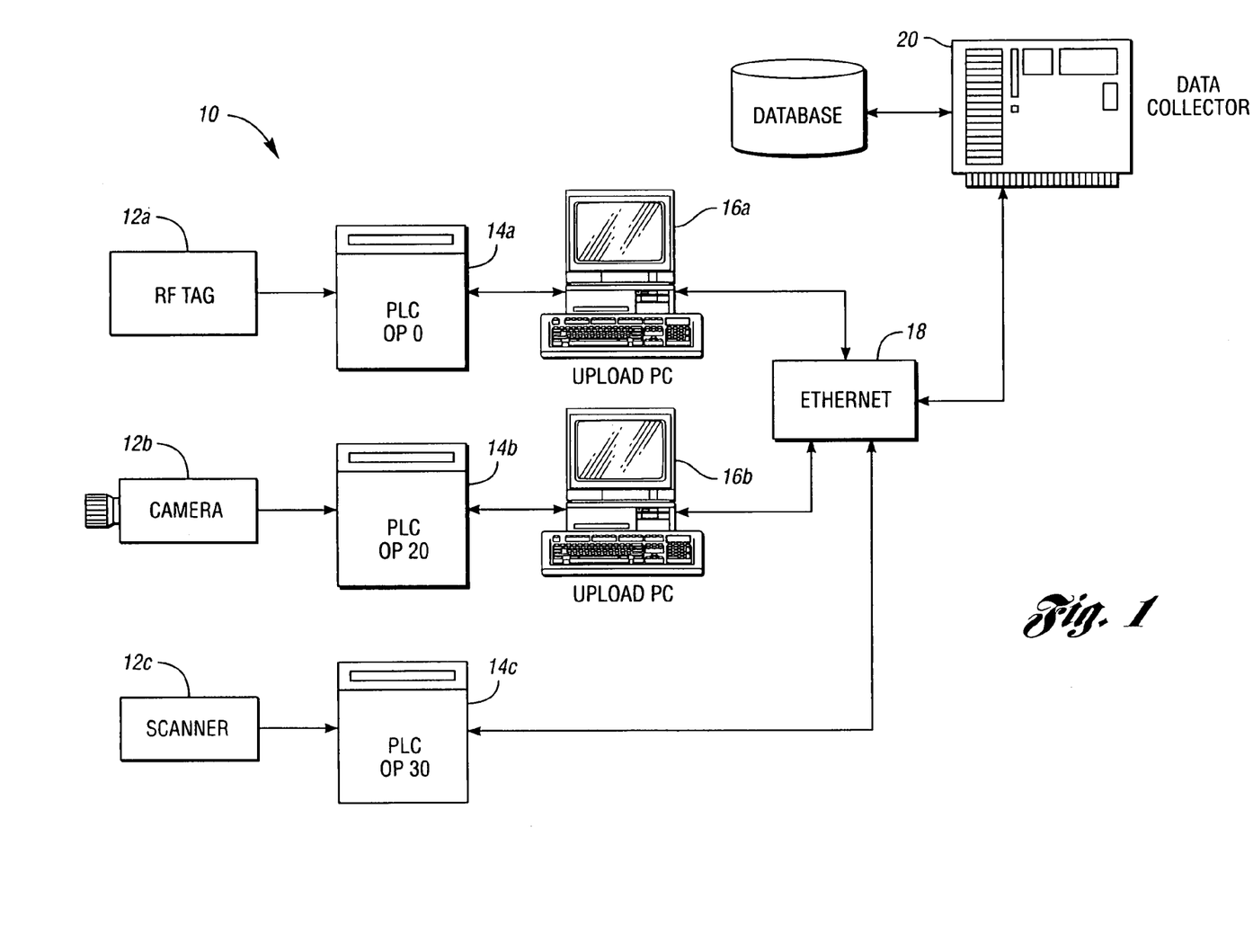
FIG. 1 depicts an example hardware architecture that may be implemented to support these and other aspects of the present invention.

FIG. 1 depicts an example hardware architecture that may be implemented to support these and other aspects of the present invention.

Architecture 10 comprises a variety of different data or identifier acquisition devices including but not limited to RF tag 12a, camera 12b, and scanner 12c. Typically, devices 12 interface with PLCs 14a, 14b, 14c at the manufacturing operation. In one embodiment, PLCs 14a and 14b are in operable communication with upload computers 16a and 16b for communication (e.g. Ethernet 18) with data collection server 20. Alternatively, information acquisition devices (e.g. scanner 12c) may communicate directly with data collector server 20 via computer network 18. Notably, the content or arrangement of architecture 10 may be modified or adapted to best fit a particular implementation of the present invention.

Figure 2:
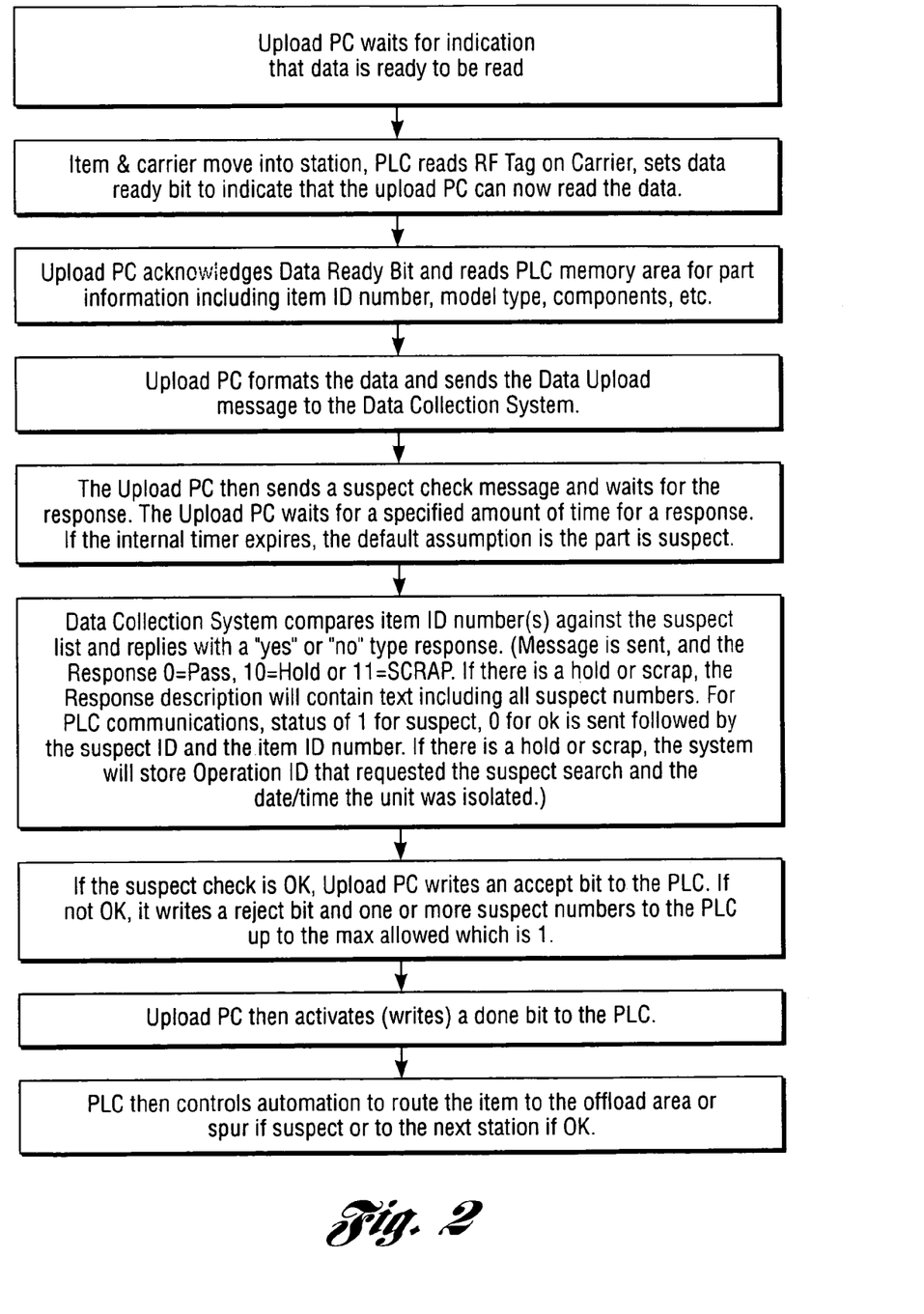
FIG. 2 is a detailed block-flow diagram illustrating a preferred methodology for implementing one embodiment of the present invention.

FIG. 2 is a detailed block-flow diagram illustrating a preferred methodology for implementing one embodiment of the present invention. Notably, the content or arrangement of FIG. 2 may be adapted or modified to best fit a particular implementation of the present invention. The process for locating and isolating suspect items may begin when an item moves into a station in the manufacturing or assembly process. At these points, the items may be checked against a database of suspect items or suspect item definitions. If a match is found, the suspect item is isolated, as necessary.

Figure 3:
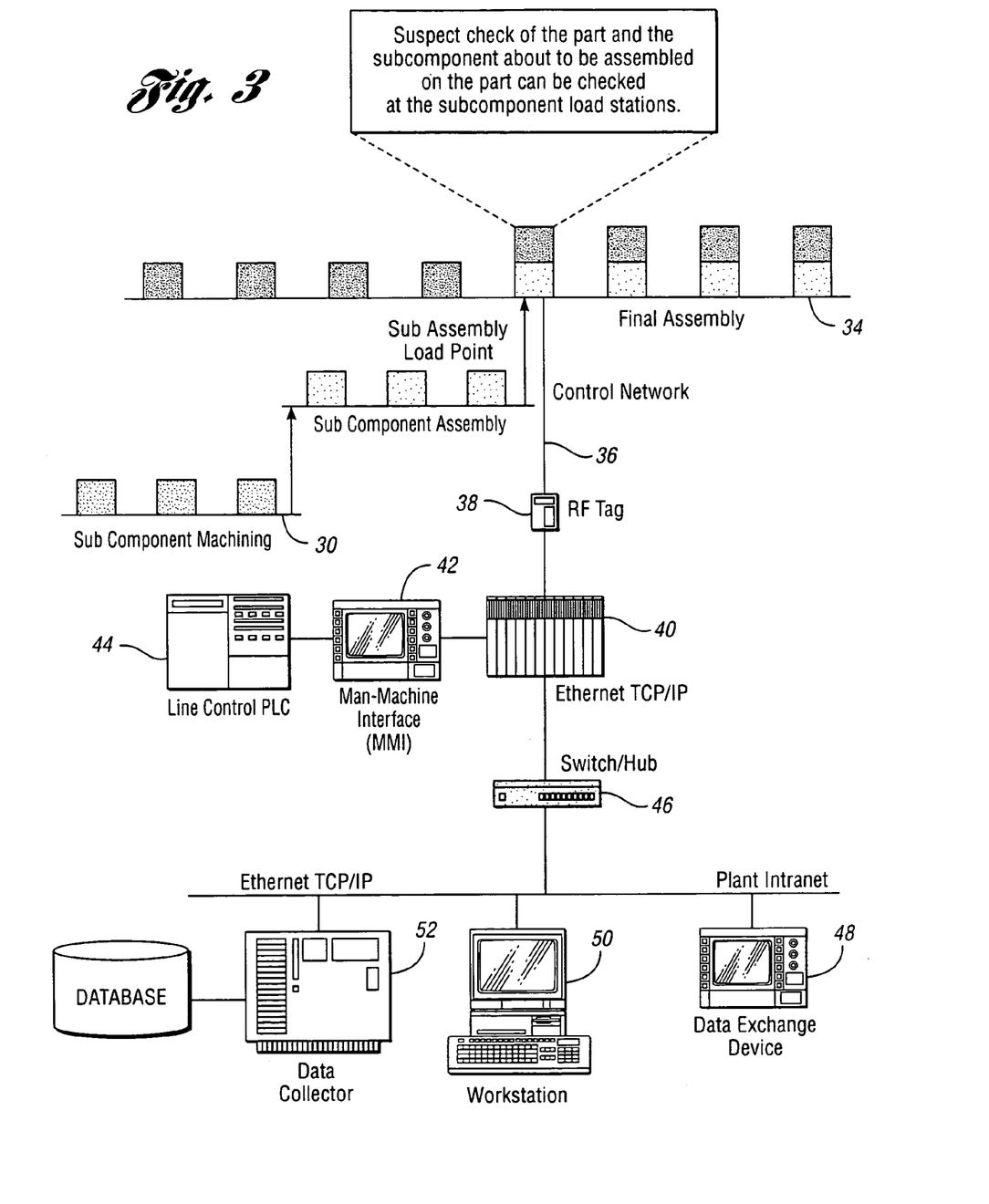
FIG. 3 shows an example manufacturing/assembly scenario where items are assembled on one assembly line, and later introduced into a final product on another assembly line.

FIG. 3 shows an example manufacturing/assembly scenario where items are assembled on one assembly line, and later introduced into a final product on another assembly line. At line 30, sub-component item machining takes place. Machined items are then transferred to sub-component item assembly line 32 where some item assembly takes place. Next, assembled items from line 32 are introduced to final assembly line 34. There, control network 36 monitors item identifiers (not shown) via RF reader 38, and communicates a check message to data collector 52 to determine whether the monitored item(s) fall within suspect item definitions stored in one or more associated databases. If an item is suspect (i.e. falls within the scope of one or more of the suspect item definitions), a communication from data collector 52 to line control PLC 44 and/or MMI 42 causes the suspect item to be isolated (e.g. rejected, scrapped, re-routed, re-manufactured, labeled, etc.). Suspect part isolation may occur automatically (e.g. automatic mechanical rejection from line, etc.) or via alert to a human line operator via alarm, pager or MMI 42, etc. Other inter-connected aspects or components of architecture shown in FIG. 3 may include a work station 50, data exchange device 48, and switch/hub 46. Communication or control network 36 may include Ethernet TCP/IP.

According to another aspect of the present invention, inference techniques may be implemented to locate or estimate the location of items that either lack an identifier, or are no longer located within an ongoing manufacturing or assembly process (e.g., items stored in holding bays, racks, warehouses, in-transit, other plants, etc.). Typically, an inferred location will be based on known location reference points related to the manufacture or assembly of those items.

For example, one reference point may provide vender/lot/time-date information for items when the items are introduced into an assembly line. This information may be obtained by scanning a barcode located on the shipping container for the items. Of course, other data-gathering techniques may be implemented as well.

The reference point information may then be included in a build history for the finished product when item data is received at the data collection system.

As the non-serialized item travels along the manufacturing line, the data collection system may receive updates of what station and what subcomponents were installed at what time/date. The data collection system may be in communication with all stations on the line and may optionally have buffer and shipping areas configured as well.

Average cycle times (the time a particular station takes to complete a processing step) of the stations may be monitored by the system as well. Based on the above information, non-serialized items that are to be tracked/isolated can be either precisely or approximately located on the manufacturing line. Similar inference techniques can be implemented to estimate the location of items that are in storage, in-transit to another location, or are at another location.

Embodiments of the present invention may be implemented in distributed manufacturing, transit and storage locations that are in operable communication with one another. For example, suspect item definitions and item location information may be broadcast or otherwise transmitted between distributed locations in a manufacturing and supply chain to facilitate and enhance the tracking and isolation of suspect items. Intercommunication of such information is well within the knowledge of those skilled in the information technology arts.

A message transaction methodology may be utilized to facilitate request and response actions for conformance checking. According to one embodiment, a device controller (PC or PLC) is programmed to read the unit ID number of a particular item, formulate a message which asks the data collection system if there is a request to isolate this item, receive a response back from the data collection system, and translate the answer to determine whether the current item is to be isolated.

For example, a station device controller may begin by issuing a unit status request message to the host data collector requesting validation that the item can begin processing at the station—that the pending item identifier is not suspect. The data collection system may then perform a suspect search and respond with a message received which may contain a response or response code (e.g., response code O=Pass, 10=Hold, or 11=scrap, etc.).

If there is a hold or scrap, the data collection system may store the date, time, and operation ID that requested the suspect search. If the part proceeds down the line or is reintroduced to the line without being removed from the suspect list, then this tracking information may be updated.

According to one embodiment of the present invention, the item status request message includes three sections. Of course, a different message format may be utilized. These sections are:

100—Message Header Section
201—Item Identification Section
202—Station Identification Section The item identification section may be used to identify a single part, sub-assembly, assembly, or fixture to be checked for suspect status. The item identifier field may include or equate to the item ID number. According to one embodiment, an item action message may be set to 5=suspect to tell the data collection system to perform a suspect check on that item.

Table 1 sets forth an example message format for the item identification section in accordance with one embodiment of the present invention.

TABLE 1

| Name | Length | Size | Content | Definition |
|---|---|---|---|---|
| Section Type | Integer | 1 | 201 | Unique section identifier which identifies the information that follows below. |
| Section Size | Unsigned Integer | 1 | | Total number of words occupied by only this section |
| Number of Items | Integer | 1 | NA | Not used in the item identification section |
| Item identifier format | Integer | 1 | 1, 2, or 3 | Defines how to interpret item identifier field 1 = ASCII, 2 = Integer, 3 = Custom |
| Item Identifier | Defined by above | 40 | "2110100094604" | Unique sequence number identifying the item, converted to CHAR 20 |
| Item type format | Integer | 1 | | Defined how to interpret item type field 1 = ASCII, 2 = Integer, 3 = Custom |
| Item type | Defined by above | 13 | "1G-270-AA" | Type of item being manufactured CHAR 26 |
| Item result | Integer | 1 | 0–15 | Used to provide the result of processing at the station. Value 0 = In Process, 1 = Complete-Pass, 2 = Complete-Fail w NC, 3 = Abort, 4 = Bypass, 5 = Buyoff, 6 = Offloaded, 7 = Scrap, 8 = Offloaded-Stripback, 9 = Reload, 10 = Reload Repair, 11 = Reload-stripback, 12 = Reload-Cust. Return, 13 = Reload-Rework, 14 = Repaired, 15 = Check Point (only used for customer return) |
| Fixture identifier format | Integer | 1 | 1 or 2 | Defines how to interpret fixture identifier field. Value 1 = ASCII, 2 = Integer |
| Fixture identifier | Defined by above | 5 | | Uniquely identifies the fixture, pallet, or platter used to move item from station to station. Converted to CHAR 10. |
| Item action | Integer | 1 | 0–5 | Defines specific non-processing action performed on item. Value 0 = Production, 1 = Repai/Reload, 2 = Buyoff, 3 = Scrapped, 4 = Offload, 5 = Quarantine |

TABLE 1-continued

| Name | Length | Size | Content | Definition |
|---|---|---|---|---|
| Item Classification | Integer | 1 | 1–7, 20, 21 | Defines classification of item for processing. Value 1 = Regular, 2 = Master, 3 = PV, 4 = Gage, 5 = Customer return, 6 = Service Unit, 7 = Float, 20 = Left, 21 = Right |
| Job ID | Unsigned Integer | 1 | 0–n | Schedule job ID number item was scheduled under. Value 0 = Job ID not scheduled, 1–N = Job ID |

The multi-item identification section is used to identify multiple parts and/or subcomponents to be checked for suspect status. It may be essentially identical to the item identification section with the exception that the number of items field is used to indicate how many items serial numbers to process.

Table 2 sets forth an example message format for the multi-item identification section in accordance with one embodiment of the present invention.

TABLE 2

| Name | Length | Size | Content | Definition |
|---|---|---|---|---|
| Section type | Integer | 1 | 201 | Unique section identifier which identifies the information that follows below. |
| Section size | Unsigned integer | 1 | | Total number of words occupied by only this section. |
| Number of items | Integer | 2 | NA | Used to indicate the number of serial numbers |
| Item identifiers | ASCII | 10 | 2110100090604 | Unique sequence numbers identifying the multiple items |
| Item identifiers | ASCII | 10 | 2110100090605 | Unique sequence numbers identifying the multiple items |

A user interface may be provided to create and manage suspect item definitions. Notably, there are various types of suspect item definitions, and these types may be expanded beyond those described herein. Table 3 sets forth a plurality of example suspect items definition types.

TABLE 3

| Type 1 | serial number list |
| Type 2 | criteria list (operations, machines, date range, time range, and optional part type) |
| Type 3 | adapter plate list (date range, time range, adapter plate number, assembly/disassembly operation |
| Type 4 | sub-component where parts within assemblies can be isolated |
| Type 5 | non-serialized components |
| Type 6 | criteria list suspect item definition |
| Type 7 | operation list suspect item definition |

The type 1 suspect item definition specifies an explicit list of item Ids or serial numbers that are suspect. This type may be identified by a suspect number and suspect definition name and description.

The type 2 suspect item definition consists of multiple operation parameters. The purpose of this definition is to identify equipment and/or processes that have caused an issue within a period of time and to subsequently isolate parts that had previously been processed by this set of suspect operations. Table 4 sets forth parameters that may be defined for this definition.

TABLE 4

| Parameter | Data Type | Description |
|---|---|---|
| Area | Text | One or more letters or codes of the affected area. |
| Operation Number | Text | One or more operation IDs. |
| Machine Number | Text | One or more machine numbers. |
| Start Date | Date | The beginning date in a range of dates. |
| End Date | Date | The ending date in a range of dates. |
| Start Time | Date | The beginning time in a range of times. |
| End Time | Date | The ending time in a range of times. |
| Part Type | Number | The part type (left hand or right hand). This parameter is optional and, if not specified, signals both parts. |

The type 3 suspect item definition is used to define one or more fixtures or adapter plates or carriers that are suspected of having defects. There are multiple parameters that may be associated with this type of quarantine, as indicated in Table 5.

TABLE 5

| Parameter | Data Type | Description |
| --- | --- | --- |
| Start Date | Date | The beginning date in a range of dates. |
| End Date | Date | The ending date in a range of dates. |
| Start Time | Date | The beginning time in a range of times. |
| End Time | Date | The ending time in a range of times. |
| Adapter Plate Number | Text | One or more adapter plate numbers (or pallet IDs). |
| Assembly Op | Text | One Assembly operation. |
| Disassembly Op | Text | One Disassembly operation |

A date/time range is indicated as one of the parameters in this definition along with the adapter plate number(s). These ranges represent the dates and times that a suspected issue has been identified for an adapter plate. All items attached to the adapter plate(s) during these dates and times may be isolated. The assembly operation and disassembly operation may be added to compare the date ranges and determine quarantine status. Assembly operation and disassembly operation are used with the start and end dates/times to determine if an item was attached to the suspect adapter plate.

The type 4 suspect item definition specifies assemblies and associated subassemblies or subcomponents which are to be isolated. For example, isolating all assemblies with certain component item ID numbers installed. The parameters associated with this definition may include the item ID numbers and/or date/time ranges indicating what time range given item ID numbers should be isolated. Table 6 below indicates example parameters.

TABLE 6

| Parameter | Data Type | Description |
| --- | --- | --- |
| Start Date | Date | The beginning date in a range of dates. |
| End Date | Date | The ending date in a range of dates. |
| Start Time | Date | The beginning time in a range of times. |
| End Time | Date | The ending time in a range of times. |
| Unit ID number | Text | One or more master item ID numbers. |
| Sub-component Serial number | Text | One or more sub-component or sub-assembly serial numbers. |

The type 5 suspect item definition applies to non-serialized items which can be identified by date/time and vendor/lot number such as fasteners. As set forth in table 7, multiple operations may exist for this definition.

TABLE 7

| Parameter | Data Type | Description |
| --- | --- | --- |
| Start Date | Date | The beginning date in a range of dates that items or parts were loaded at line. |

TABLE 7-continued

| Parameter | Data Type | Description |
| --- | --- | --- |
| End Date | Date | The ending date in a range of dates that items were used at the line. |
| Start Time | Date | The beginning time in a range of times. |
| End Time | Date | The ending time in a range of times. |
| Vendor | Text | Vendor of manufacturer of suspected items. |
| Lot Number | Text | Lot number of suspected items. |

The type 6 suspect item definition includes multiple operation parameters. The purpose of this definition is to identify equipment and/or processes that have caused an issue within a period of time and to subsequently isolate items that had previously been processed by this set of suspect operations. Table 8 sets forth example parameters for this suspect item type.

TABLE 8

| Parameter | Data Type | Description |
| --- | --- | --- |
| Operation Number | Text | One or more operation IDs. |
| Machine Number | Text | One or more machine numbers. |
| Start Date | Date | The beginning date in a range of dates. |
| End Date | Date | The ending date in a range of dates. |
| Start Time | Date | The beginning time in a range of times. |
| End Time | Date | The ending time in a range of times. |
| Part Type | Number | The item type (left hand or right hand). This parameter is optional and, if not specified, signals both parts. |
| Line Number | Number | The line identifier the item is being processed on. |

The type 7 suspect item definition includes multiple operation parameters with alternative operation paths. The purpose of this definition is to identify equipment and/or processes including alternative operation paths that have caused an issue within a period of time and to subsequently isolate items that had previously been processed by this set of suspect operations.

According to one embodiment of the present invention, the manufacturing or assembly process may be dynamically modified according to a suspect item definition to avoid assembly or manufacturing operations thought or known to be causing/creating suspect items. For example, PLC line controllers may automatically implement dynamic or pre-defined or logic-driven line changes to bypass defective operations, or to substitute alternative or back-up operations. In this fashion, the manufacturing/assembly process may continue without the use of operations thought or known to be creating suspect items.

As parts are isolated, an aspect of the present invention enable users to perform searches on the database(s) to determine the current location or inferred location of any isolated items. Locations can be in-process locations, or locations outside of the manufacturing or assembly process (e.g. warehouses, other plants, in-transit, etc.).

Users can also search on any of the criteria fields to get a list of all items that meet the criteria and should be isolated.

Users can also delete suspect item definitions, remove items from a suspect item list, and scrap items that might or might not have been isolated.

A user interface, such as a web-enabled user interface, may be provided to facilitate the management of suspect items in accordance with the present invention. Users with proper authorization can access these user interfaces. The web interface may be configured to store suspect item definitions in a central repository with an optional upload process used to populate other locations in order to provide robustness and quick response. Suspect item definitions may be stored in one central location. High volume production lines, for example, may require more than one database in order to provide adequate response times to the manufacturing process.

The web interface may be designed using object-oriented components to allow flexibility in adding functionality and suspect item types. This design also provides a secure and efficient process for adding functionality, creating new suspect item definitions, and performing item checks.

The web enabled user interface may be served by a central plant web server. To facilitate processing, components may be installed on the web server that process item check requests via the web interface. These components may then update the central data store as required. Then a synchronization process may ensure that other optional data stores are synchronized with updates. Specific functionality provided in the web component may include creation of suspect item definitions, deletion of definitions and items, obtaining suspect item definition information, scrapping items, and obtaining item history within the manufacturing process. Preferably, suspect item definitions that are deleted are not actually removed from the system. They are instead marked as inactive and are not used but the history of the definition is preserved.

User interfaces may be distributed throughout the local or distributed manufacturing environment and/or supply chain.

A Search/Maintenance screen may allow the user to list item Ids for a particular suspect item definition as well as remove or scrap specific item Ids from that particular definition.

A Part Search screen may identify a suspect item number and its associated item serial number. Details of the suspect item definition can also be displayed.

A suspect item definition screen may be used to search for suspect item definitions based on different parameters. Currently, in one embodiment, this screen shows two search criteria, date and whether the suspect item definition is active or closed. When a Start Search button is pressed, the suspect item definitions matching the parameters may be displayed in a Results table.

Figure 4:
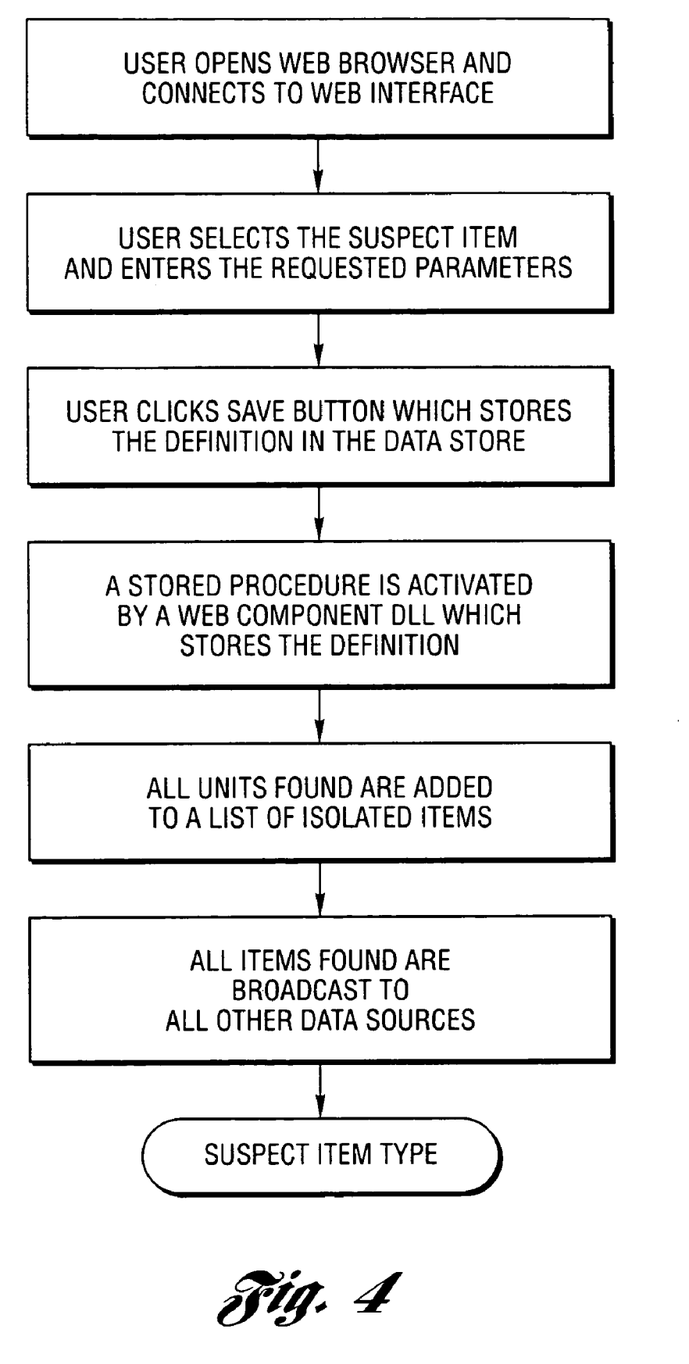
FIG. 4 is a detailed block-flow diagram describing a preferred methodology for defining a suspect item in accordance with one aspect of the present invention.

FIG. 4 is a detailed block-flow diagram describing a preferred methodology for defining a suspect item in accordance with one aspect of the present invention.

Figure 5:
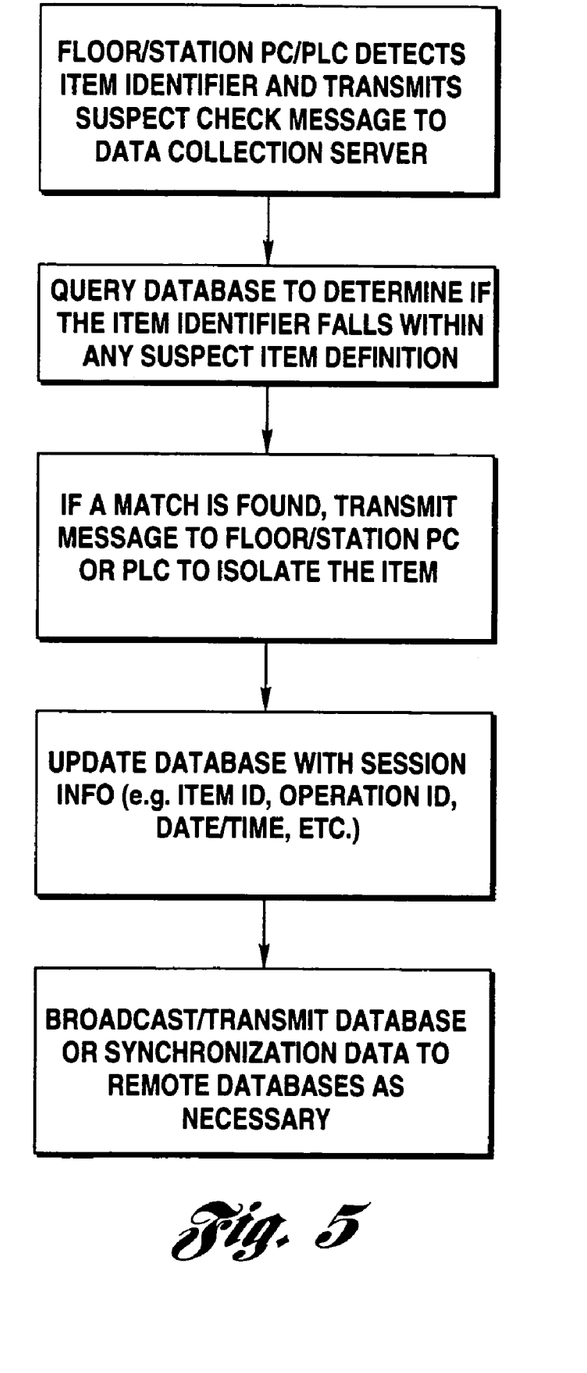
FIG. 5 is a detailed block-flow diagram describing a preferred methodology for checking an item against a suspect item definition in accordance with one aspect of the present invention.

FIG. 5 is a detailed block-flow diagram describing a preferred methodology for checking an item against a suspect item definition in accordance with one aspect of the present invention.

Notably, the content and arrangement of FIGS. 4 and 5 may be modified to best fit a particular implementation of the present invention.

While the best mode for carrying out the invention has been described in detail, those familiar with the art to which this invention relates will recognize various alternative designs and embodiments for practicing the invention as defined by the following claims.

What is claimed:

1. A computer-implemented method for automatically isolating suspect items in a manufacturing environment, the method comprising:
   inputting one or more suspect item definitions into a computer database;
   automatically detecting an identifier for an item in a manufacturing or assembly process;
   comparing the detected item identifier with the one or more suspect item definitions; and
   if the detected item identifier falls within one or more of the suspect item definitions, automatically isolating the item in the manufacturing or assembly process.

2. The method of claim 1 additionally comprising displaying a location for the item.

3. The method of claim 2 wherein the location for the item is inferred.

4. The method of claim 1 wherein the step of isolating the item comprises physically removing the item from the manufacturing or assembly process.

5. The method of claim 1 additionally comprising automatically modifying the manufacturing or assembly process to bypass one or more suspect manufacturing or assembly operations.

6. The method of claim 1 wherein the suspect item definition includes one or more item serial numbers.

7. The method of claim 1 wherein the suspect item definition includes a manufacturing or assembly operation.

8. The method of claim 1 wherein the suspect item definition includes a time or date range.

9. The method of claim 1 wherein the suspect item definition includes an adapter plate identifier.

10. The method of claim 1 wherein the suspect item definition includes a sub-component identifier.

11. The method of claim 1 additionally comprising communicating one or more suspect item definitions to a remote location outside of the manufacturing or assembly process.

12. The method of claim 11 wherein the remote location is a remote manufacturing or assembly plant.

13. A computer system for automatically isolating suspect items in a manufacturing environment, the system comprising one or more computers operably programmed and configured to:
   receive information including one or more suspect item definitions into a computer database;
   receive information including an identifier for an item in a manufacturing or assembly process;
   comparing the item identifier with the one or more suspect item definitions;
   if the detected item identifier falls within one or more of the suspect item definitions, output a signal to a manufacturing or assembly station whereat the item is automatically isolated from manufacturing or assembly process.

14. The system of claim 13 wherein the one or more computers are additionally programmed and configured to display a location for the item.

15. The system of claim 13 wherein the one or more computers are additionally programmed and configured to infer the location of the item.

16. The system of claim 13 wherein the item is physically removed from the manufacturing or assembly process.

17. The system of claim 13 wherein the one or more computers are additionally programmed and configured to modify the manufacturing or assembly process to bypass one or more suspect manufacturing or assembly operations.

18. The system of claim 13 wherein the one or more computers are additionally programmed and configured to support a graphical user interface for inputting suspect item definitions.

19. The system of claim 13 wherein the one or more computers are additionally programmed and configured to support a graphical user interface for displaying the location of one or more suspect items falling within a suspect item definition.

20. The system of claim 13 wherein the one or more computers are additionally programmed and configured to communicate one or more suspect item definitions to a remote computer located outside of the manufacturing or assembly process.

* * * * *